Oct. 12, 1937.   N. A. WAHLBERG ET AL   2,095,777
TROLLEY WIRE SPLICER
Filed March 12, 1936
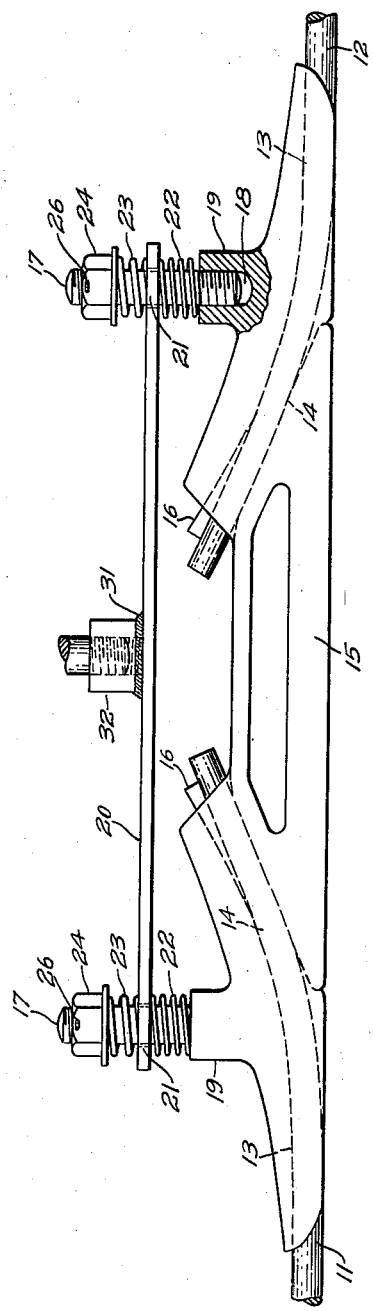
WITNESSES:
INVENTORS
Nils A. Wahlberg and
Leland F. Brahmer.
BY
ATTORNEY Patented Oct. 12, 1937

2,095,777

UNITED STATES PATENT OFFICE 2,095,777

TROLLEY WIRE SPLICER

Nils A. Wahlberg and Leland F. Brahmer, Wilkinsburg, Pa., assignors to Westinghouse Electric & Manufacturing Company, East Pittsburgh, Pa., a corporation of Pennsylvania Application March 12, 1936, Serial No. 68,423

6 Claims. (Cl. 191—44.1)

Our invention relates in general to overhead trolley line systems, and it has particular reference to the construction of a splicing device for trolley wires.

It is well known that one of the major expenses in the maintenance of an overhead trolley system lies in trolley wire breakage. This breakage is not always due to wearing of the conductor, but occurs primarily through crystallization of the conductor itself.

Such crystallization occurs at points of support, where bending stresses are incurred. It is promoted by the natural tendency of any suspended line to vibrate, and still further aided by the hammer-like blows of the current collecting device as it traverses irregularities and "hard" spots in the line.

Another fault of such irregularities and "hard" spots is the noise incident to them. As the current collecting device traverses them, it transmits the incurred vibrations down the trolley pole and hence to the roof of the vehicle. The roof acting as a drum head, such vibrations are highly magnified and may become very disturbing to passengers within the vehicle.

With the advent of higher trolley speeds, such breakages and noises have become still more pronounced. Trolley wire breakages are obviously an expense, and in this day of close competition it may easily be seen that annoying noises, such as caused by vibrating trolley poles, may readily drive prospective passengers to quieter means of transportation, thereby also becoming an expense.

Reduction of operating expenses is always an important point to consider. Hence the introduction of a spring-mounted splicer is of great commercial value, and particularly such a "floating" spring mounted splicer as embodied in our invention.

The object of this invention is to provide a resiliently supported trolley wire splicer which, when a current collecting device traverses it, will permit a cushioned upward and downward motion of the trolley wire splicer relative to the support, while preventing undue lateral movement and misalinement of the trolley wire.

A further object of this invention is to permit adjustment in both the degree and extent of the cushioning action of the trolley splicer.

A still further object of the invention is to allow for some adjustment of the initial angle of the trolley wire splicer with its support.

Other objects of our invention will in part be obvious and in part appear hereinafter.

Our invention accordingly is disclosed in the embodiment hereof shown in the accompanying drawing and comprises the features of construction, combination of elements, and arrangement of parts which will be exemplified in the construction hereinafter set forth, and the scope of the application of which will be indicated in the appended claims.

For a more complete understanding of the nature and scope of our invention, reference may be had to the following detailed description taken in connection with the accompanying drawing, in which the single figure is a view in side elevation of a trolley wire splicer embodying the principle features of the invention, certain parts being broken away to more clearly illustrate the invention.

Referring to the drawing, it will be seen that the flexible trolley splicer comprises a main body 15 furnished with a groove 13 on the under side at each end, terminating in an upwardly extending opening 14 through the main body.

Adjacent ends of a trolley wire 11 and 12 are disposed to lie in the grooves 13 and extend upward through the openings 14, being firmly secured in any suitable manner such, for example, as by means of wedges 16.

The main body 15 is provided with an upwardly projecting stud 17 on the upper surface of each end. These studs 17 may be either an integral part of the main body 15, or may be as shown in the right-hand of the figure, threaded into an opening 18 of a boss 19.

The rigid support member 20 for supporting the main body 15 is shown as a bar section, but might quite well be of a channel section, any other suitable rolled section, or cast.

The rigid support member 20 is provided with an opening 21 near each end, through which the studs 17 may pass. The openings 17 are of such dimension as to permit a stud 17 to pass through freely without any undue clearance. This permits a relative upward and downward movement of the main body 15 and the rigid support 20, without any undesirable lateral motion which might lead to misalinement of the trolley wires 11 and 12.

To provide for a resilience of upward movement between the main body 15 and the rigid support 20, helical springs 22 are disposed about the upright studs 17, between the main body 15 and the rigid support member 20.

In order to support the weight of the trolley wires 11 and 12 and to allow for resilient downward movement of the main body 15, the helical springs 23 are disposed about the studs 17, above the rigid support member 20. The helical springs 23 are of heavier construction than the springs 22 to allow for the weight of the trolley wires 11 and 12.

Nuts 24 are disposed on the threaded studs 17, cooperative to permit adjustment of the degree and extent of the relative movement of the main body 15 and the rigid support member 20. Cotter pins 26, or other suitable means, are disposed to prevent undesirable rotation of the nuts 24.

Located substantially at the mid-section of the rigid support member 20 is a hollow mounting boss 32, adaptable for mounting on a hanger (not shown). The mounting boss 32 may be firmly secured to the rigid supporting member 20 by means of a fillet weld 31, or other suitable method of fastening.

By initial adjustment of the nuts 24, any predetermined degree or extent of resilience may be set, thus readily adapting the splicer to the conditions of tension to be met with in the particular section where it is used. By different adjustments of each of the nuts 24, allowance may be made for variation in the angle of mounting, thus adapting the splicer to locations of limited overhead, where it must be mounted on the under side of a bridge or roof of a tunnel.

As a current collecting device traverses the conductor, there will be a gradual rising of both conductor and splicer, due to the upward pressure of the current collector, instead of the conductor itself being bent upward where it enters the groove of the splicer, as was the case with rigidly mounted splicers. This relieves the conductors 11 and 12 of practically all bending stresses and possibilities of failure by fatigue.

When the current collector has passed there will be no sudden cessation of downward motion, as in the case of a splicer adapted for resilient motion in the upward direction only. There will be, instead, a gradual lowering of the line without any shock of sudden stop, and the trolley will "float", giving a minimum of conductor stress and a minimum of noise effects.

There is little or no undesirable lateral motion in this design of cushioned splicer as the studs 17 are provided with sliding fits where they pass through the rigid support member 20. This is a decided improvement over the use of thin spring supporting members where the flexing of the member itself in the lateral direction was not entirely preventable, thus leading to undesirable side sway.

Since further changes may be made in the above construction, and different embodiments of the invention may be made without departing from the scope thereof, it is intended that all matter contained in the above description, or shown in the accompanying drawing, shall be interpreted as illustrative and not in a limiting sense.

We claim as our invention:

1. In combination, a trolley wire splicing member, a rigid supporting member, and means including a system of helical springs cooperative with guide members to allow limited resilient upward and downward relative motion of the splicing member and the supporting member from the normal position.

2. A trolley wire splicer, comprising, in combination, a body member disposed to secure firmly the adjacent ends of a trolley wire, a rigid support member, and means including helical springs and guide members for connecting the body member to the support member and permitting limited and adjustable relative upward and downward movement of the body member and the rigid support member from the normal position of rest.

3. A trolley wire splicer, comprising, in combination, an elongated rigid support member having vertical openings adjacent to the ends thereof, a main body member having means for securing firmly the adjacent ends of a trolley wire, a pair of upright threaded guide studs disposed on the upper surface of the main body in alinement with the openings of the rigid support member, and of such dimension as to allow a sliding fit therein, springs disposed about each stud cooperative to permit a resilient relative upward and downward movement of the main body and the rigid support member from the normal free position, and means on each stud disposed to restrain the resilient movement.

4. A trolley wire splicer, comprising, in combination, a body member with means for securing firmly the adjacent ends of a trolley wire, a rigid support member, a pair of helical springs disposed between the body member and the rigid support member to cushion the upward motion of the body member, a pair of relatively heavy helical springs disposed above the rigid support member to carry the dead weight of the trolley wire and to cushion the downward motion of the body member and the trolley wire when a current collecting device traverses it, and guide means associated with the helical springs for limiting and adjusting the relative motion of the body member and rigid support member.

5. A trolley wire splicer, comprising, in combination, a body member disposed to secure firmly the adjacent ends of a trolley wire, a rigid support member, guide means allowing relative movement of the members, a plurality of helical spring members disposed about the guide means to permit a floating upward and downward relative movement of the body member and the support member, means for limiting and adjusting this movement, and a mounting boss disposed on the upper face of the rigid support member, substantially at the mid-portion thereof.

6. A trolley wire splicer, comprising, in combination, a rigid supporting member provided with a mounting boss substantially on the mid-portion thereof, and vertical openings adjacent to the ends, a body member adapted to secure firmly adjacent ends of a trolley wire, a pair of upstanding threaded studs disposed on the upper surface of the body member and projecting movably through the openings of the rigid support member, a helical spring disposed about each stud between the rigid support member and the main body to permit cushioned relative upward motion thereof, a heavier helical spring disposed about each stud above the rigid support member to carry the weight of the trolley wire and to allow cushioned downward relative movement of the body member from the normal free rest position, and a nut disposed on each stud cooperative to limit and adjust the extent and degree of such relative movement.

NILS A. WAHLBERG.
LELAND F. BRAHMER.